March 10, 1959     K. M. SNIDER     2,876,982

VALVE HEADS FOR ROTATABLE VALVE STEMS

Filed April 11, 1955

INVENTOR
Kenneth M. Snider

BY
ATTORNEYS

United States Patent Office 2,876,982
Patented Mar. 10, 1959

2,876,982

VALVE HEADS FOR ROTATABLE VALVE STEMS

Kenneth M. Snider, Mansfield, Ohio, assignor to The American Coupler Company, Cleveland, Ohio, a corporation of Ohio Application April 11, 1955, Serial No. 500,623

3 Claims. (Cl. 251—88)

This invention relates to valves and more particularly to valve heads movably connected for accommodation to a seat.

In valves actuated by a rotatable valve stem carrying a valve head, the head is very frequently seriously damaged by repeated seatings, since the head is generally screwed down tightly upon the seat, with consequent rotation of the head, and the frictional contact of the head with the seat wears and often breaks the head.

An important object of this invention is to provide a valve head which will not wear, due to friction, nor will it be apt to break, after repeated seatings.

Another important object is to provide a valve head for a rotatable valve stem which head includes a seating portion which does not rotate after the portion initially contacts the seat, but will be forced against the seat, during subsequent valve-closing rotation of the valve stem, into fluid sealing contact with the seat, whereby there will be substantially no wear upon the portion nor will it be apt to break.

Still another important object is to provide a valve head including an outer seat-contacting cap portion disposed upon a fixed valve head portion integral with a rotatable valve stem, with antifriction means between the cap portion and fixed valve head portion to permit rotation of the latter independently of the cap portion, whereby when the cap portion initially contacts the seat, upon rotation of the valve stem, the cap portion will be frictionally retained by such contact and the valve stem may be further rotated to provide a fluid excluding contact by the cap portion with the seat.

Additionally, an important object is to provide a flexible hollow valve head portion of a valve head which portion may be readily snapped upon or removed from a second valve head portion, with the first head portion having a pocket to receive lubricant.

Another important object is to provide a flexible and compressible valve head portion of a valve head which is streamlined to minimize retardation of the flow of fluid.

Other objects and advantages of the invention will be apparent during the course of the following detailed description of the invention, taken in connection with the accompanying drawing, forming a part of this disclosure, and in which drawing.

Figure 1:
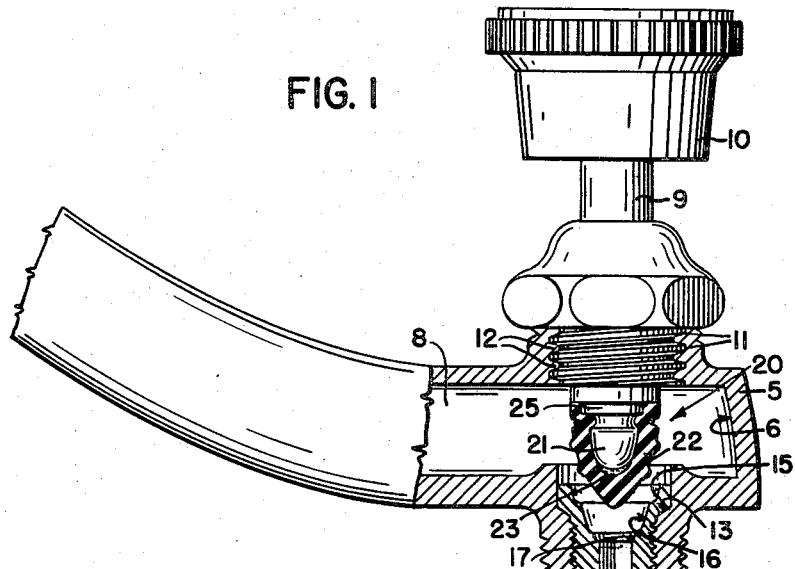
Fig. 1 is a view, partly in elevation and partly in vertical section of a valve including the new valve head, which latter is shown mostly in vertical section.

In the drawing wherein for the purpose of illustration is shown a preferred embodiment of the invention and wherein similar reference characters designate corresponding parts throughout the several views the valve is shown, by way of example, as including a valve body or housing 5, having a chamber 6 therein communicating with an intake passageway 7 and a discharge passageway 8. The valve also includes a valve stem 9 extending both exteriorly and interiorly of the housing 5, provided with a handle 10 at its exterior end. Because of the ease of seating the valve head upon the seat, this handle may be a mere knob, since no leverage action is needed. The stem 9 is preferably cylindrical and includes exterior screw threads 11 upon an intermediate portion of its length, cooperating with screw threads 12, carried by the body 5, for rotation of the valve stem in a straight path in both directions longitudinally. There is also provided a valve seat recess 13 which may be screw threaded to receive a valve seat 14 preferably having a plurality of valve seating surfaces, such as the stepped surfaces 15, 16 and 17. The surface 14 has the largest circumference with the others of decreasing circumference. A polygonally surfaced socket 18 is provided at the inner end of the seat to receive a suitable tool for rotation of the seat in positioning it.

At the inner end of the stem 9 is a valve head, designated generally as 20 and comprising a fixed substantially rigid first portion 21, preferably integral with the stem, a freely movable second portion 22 and means 23 between the portions 21 and 22 to permit rotation of the portion 21 while the portion 22 is frictionally held by the valve seat 14. Not only does this means 23 function as above but it also permits some distortion of the shape of the portion 22 so that it will be firmly seated. Preferably, there is also provided means 24 for compressing the portion 22 as will be subsequently explained.

The fixed portion 21 includes a cylindrical part 25 next adjacent the inner end of the stem 9, of less circumference than that of the stem, whereby a shoulder 26 is provided, facing the seat 14. Next to the part 25 is preferably a waist or circumferentially-reduced part 27 having a transversely curved periphery and next adjacent thereto is a domed part 28 with its portion of greatest circumference greater than the least circumference of the waist part 27. Preferably, the surface of the portion 21 is smooth.

The freely movable portion 22 of the valve head 20 is of a compressible material, such as rubber, having a generally domed shape and provided with a recess 30 to accommodate the portion 21 and a pocket at the base of the recess to accommodate the means 23 as well as a peripheral groove 31 to accommodate the means 24. More specifically, the recess is stepped to snugly accommodate the cylindrical part 25 and waist part 27 and also accommodate the domed part 28, as well as leave a space or pocket 32 between the tip of the portion 21 and end wall of the portion 22 (i. e., at the bottom of the recess 30) to accommodate the means 23. This space 32 is preferably small. When the portion 22 is slipped over the portion 21, the edge 34 of the former will abut the shoulder 26.

The means 23 may be any suitable lubricant. For example it may be hydrogenated cottonseed oil or dehydrated castor oil. It is introduced to the closed end of the recess 30 prior to slipping the portion 22 over the portion 21.

The means 24 is preferably a snap ring of steel, snapped into the groove 31 of the portion 22 after the latter is in place upon the portion 21 and is so disposed that it will compress the material of the latter at the waist part 27 of the portion 21. It tends to prevent the oozing of the lubricant from the open end of the portion 22.

It is now clear that the shape of the portions 21 and 22 and the material of the portion 22 will permit ready manual removal from and replacing of the portion 22 upon the portion 21. Moreover, the contour of the portion 22 is conductive to ready flow of fluid from the intake passageway 7 when the valve is open.

Figure 2:
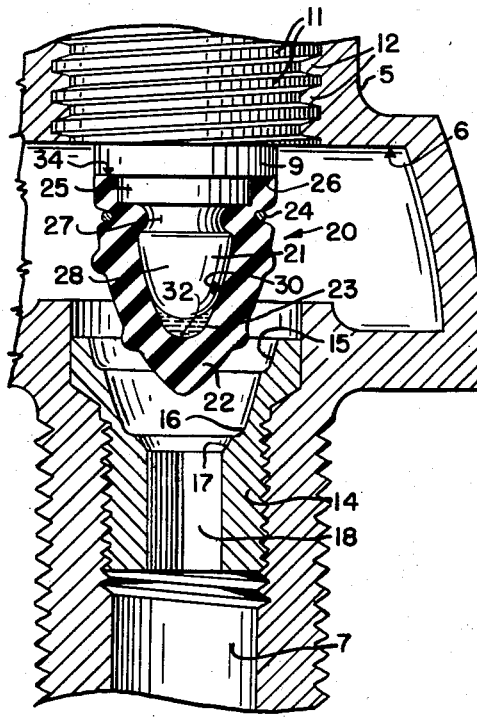
Fig. 2 is an enlarged fragmentary vertical section of the valve open.
Figure 3:
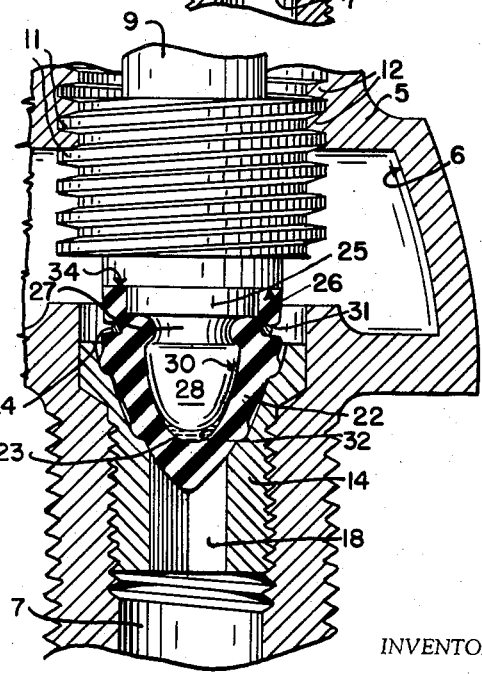
Fig. 3 is an enlarged fragmentary vertical section of the valve closed.

Figs. 1 and 2 show the parts with the valve open. As the handle 10 is rotated in one direction, the stem 9 and valve head 20 will rotate with it until the head portion 22 frictionally engages the seat 14. Then the head portion 22 will cease rotation but the portion 21 will rotate with the stem. The means 23 will lubricate the surface of the recess 30 so as to enable the portion 22 to resist rotation but the portion 22 will continue to move longitudinally of the stem 9 as the latter is rotated. This will cause portion 22 to firmly seat but without distortion. The lubricant of the means 23 will squeeze between the walls of the portions 21 and 22 toward the open end of the latter, as shown in Fig. 3, but cannot squeeze out because of the means 24. This will lubricate additional surface areas of the portion 22 as the pressure upon the latter increases in tighter seating, and tend to further aid the portion 22 to resist rotation. A very tight seating of the head 20 is possible by the arrangement disclosed.

When the handle 10 is rotated to open the valve, the portion 22 will not begin to rotate until it has cleared the seat, thus adding to the life of the head.

Various changes may be made to the form of the invention herein shown and described without departing from the spirit of the invention or scope of the claims.

What is claimed is:

1. A valve head for a rotatable valve stem, said head including a first head portion for extending from said stem and having a cylindrical part next adjacent said stem, a waist part next adjacent said cylindrical part, and a domed part at the free end of said first head portion with said waist part being circumferentially reduced in size over said cylindrical part and that portion of said domed pan next adjacent said waist part and said waist part being between said cylindrical part and domed part, a second head portion of compressible material having a recess to receive said parts and also provide a lubricant pocket at the lower part of said recess, said head portions being relatively rotatable a pool of lubricant in said pocket, and means carried by said second head portion to cause a part of the material of said second head portion to protrude into the waist of said waist part, and prevent, in conjunction with said waist part and the material of said second head part in contact with the wall of said waist part, the flow of lubricant from said recess.

2. A valve head according to claim 1 characterized in that said second head portion includes a mouth part engaging said cylindrical part, and said means to prevent the flow of lubricant is disposed opposite said waist part and closely adjacent said mouth part and cylindrical part.

3. A valve head according to claim 1 characterized in that said second head portion includes a mouth part engaging said cylindrical part, and said means to prevent the flow of lubricant is disposed opposite said waist part and closely adjacent said mouth part and cylindrical part and compresses the material of said second head portion opposite said waist part.

References Cited in the file of this patent

UNITED STATES PATENTS

| 193,840 | Andrews | Aug. 7, 1877 |
| 1,497,726 | Keenan | June 17, 1924 |
| 2,603,445 | Marchant | July 15, 1952 |

FOREIGN PATENTS

| 12,461 | Great Britain | Apr. 6, 1905 |